US009706426B2

(12) United States Patent
Poola et al.

(10) Patent No.: US 9,706,426 B2
(45) Date of Patent: Jul. 11, 2017

(54) SYSTEMS AND METHODS FOR VISIBLE LIGHT COMMUNICATIONS PERSONAL AREA NETWORK AND WIRELESS LOCAL AREA NETWORK INTERWORKING

(71) Applicant: Extreme Networks, Inc., San Jose, CA (US)

(72) Inventors: Jeelan Poola, Bangalore (IN); Somesh Agrawal, Karnataka (IN); Prasad K, Karnataka (IN); Sundaresan Sundaram, Karnataka (IN)

(73) Assignee: EXTREME NETWORKS, INC., San Jose, CA (US)

( * ) Notice: Subject to any disclaimer, the term of this patent is extended or adjusted under 35 U.S.C. 154(b) by 0 days.

(21) Appl. No.: 14/647,176

(22) PCT Filed: Nov. 18, 2013

(86) PCT No.: PCT/US2013/070563
§ 371 (c)(1),
(2) Date: May 26, 2015

(87) PCT Pub. No.: WO2014/085124
PCT Pub. Date: Jun. 5, 2014

(65) Prior Publication Data
US 2015/0319639 A1 Nov. 5, 2015

(30) Foreign Application Priority Data
Nov. 27, 2012 (IN) .......................... 4940/CHE/2012

(51) Int. Cl.
H04B 10/00 (2013.01)
H04W 28/02 (2009.01)
(Continued)

(52) U.S. Cl.
CPC ...... H04W 28/0215 (2013.01); H04B 10/116 (2013.01); H04L 61/6004 (2013.01);
(Continued)

(58) Field of Classification Search
CPC .................................................... H04B 10/116
See application file for complete search history.

(56) References Cited

U.S. PATENT DOCUMENTS

2004/0252997 A1* 12/2004 Bolduc ................ H04B 10/114
398/115
2005/0201557 A1* 9/2005 Ishidoshiro ......... H04L 63/0492
380/44

(Continued)

FOREIGN PATENT DOCUMENTS

EP 2154916 A1 2/2010
WO 2010022374 A1 2/2010

OTHER PUBLICATIONS

International Search Report and Written Opinion for International Patent Application No. PCT/US2013/070563 mailed Feb. 28, 2014.

(Continued)

Primary Examiner — Danny Leung
(74) Attorney, Agent, or Firm — Ropes & Gray LLP

(57) ABSTRACT

A method, a controller, and a network provide Visible Light Communications Personal Area Network (VPAN) and Wireless Local Area Network (WLAN) interworking and mobility management systems and methods. The method includes receiving data traffic from both a Wireless Local Area Networking (WLAN) domain and a Visible Light Communications (VLC) domain, uniquely identifying, in a controller, a device in both the WLAN domain and the VLC domain as a same device using an addressing scheme associated with both the WLAN domain and the VLC domain, wherein the device is configured to operate in both the WLAN domain and the VLC domain, and providing data traffic to the device via one of the WLAN domain and the VLC domain based on a plurality of factors.

19 Claims, 4 Drawing Sheets

(51) Int. Cl.
  *H04W 4/00* (2009.01)
  *H04B 10/116* (2013.01)
  *H04L 29/12* (2006.01)
  *H04W 84/12* (2009.01)
  *H04W 88/06* (2009.01)

(52) U.S. Cl.
  CPC ...... *H04L 61/6022* (2013.01); *H04L 61/6077* (2013.01); *H04W 4/008* (2013.01); *H04W 28/0226* (2013.01); H04L 61/6072 (2013.01); H04W 84/12 (2013.01); H04W 88/06 (2013.01)

(56) References Cited

U.S. PATENT DOCUMENTS

| | | | |
|---|---|---|---|
| 2009/0022112 A1* | 1/2009 | Shin | H04B 10/1149 370/336 |
| 2009/0310971 A1 | 12/2009 | Kim et al. | |
| 2010/0209105 A1 | 8/2010 | Shin et al. | |
| 2011/0044218 A1* | 2/2011 | Kaur | H04W 72/1215 370/310 |
| 2011/0064405 A1 | 3/2011 | Rajagopal et al. | |
| 2011/0069962 A1* | 3/2011 | Castor | H04B 10/1149 398/115 |
| 2011/0087879 A1 | 4/2011 | Chand et al. | |
| 2011/0105134 A1 | 5/2011 | Kim et al. | |
| 2012/0045215 A1* | 2/2012 | Kim | H04B 10/116 398/128 |
| 2012/0281986 A1* | 11/2012 | Leeb | H04B 10/116 398/115 |
| 2012/0310703 A1* | 12/2012 | Cavalcanti | G06Q 30/0201 705/7.29 |
| 2015/0288427 A1 | 10/2015 | Wang et al. | |
| 2015/0318922 A1 | 11/2015 | Poola et al. | |
| 2015/0319639 A1* | 11/2015 | Poola | H04L 61/6077 398/25 |

OTHER PUBLICATIONS

International Search Report and Written Opinion for International Patent Application No. PCT/US2013/070582, filed Nov. 18, 2013.

* cited by examiner

SYSTEMS AND METHODS FOR VISIBLE LIGHT COMMUNICATIONS PERSONAL AREA NETWORK AND WIRELESS LOCAL AREA NETWORK INTERWORKING

FIELD OF THE DISCLOSURE

The present disclosure relates generally to networking systems and methods and more particularly to systems and methods for Visible Light Communications Personal Area Network (VPAN) and Wireless Local Area Network (WLAN) interworking and mobility management.

BACKGROUND

With the explosion of smart phones, tablets, laptops, and other handheld, mobile devices both in enterprise (e.g., bring your own device or BYOD) and guest account scenarios, there is an ever increasing demand for wireless bandwidth. Conventionally, WLAN (also referred to as Wireless Fidelity (WiFi)) is a primary means of connectivity for such devices in the enterprise and guest account use cases. WLAN is generally defined in IEEE 802.11 and variants thereof. Increasingly, WLANs are getting choked as demand grows exponentially with BYOD and the like. Deploying more and more WiFi/WLAN Access Points (APs) may not be a right solution in all cases as it may be either cost prohibitive or may increase chances of interference in limited spectrum or both in some cases. Accordingly, there is a need for systems and methods to offload ever increasing WLAN/WiFi networks as the adoption of mobile devices and other devices continues.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
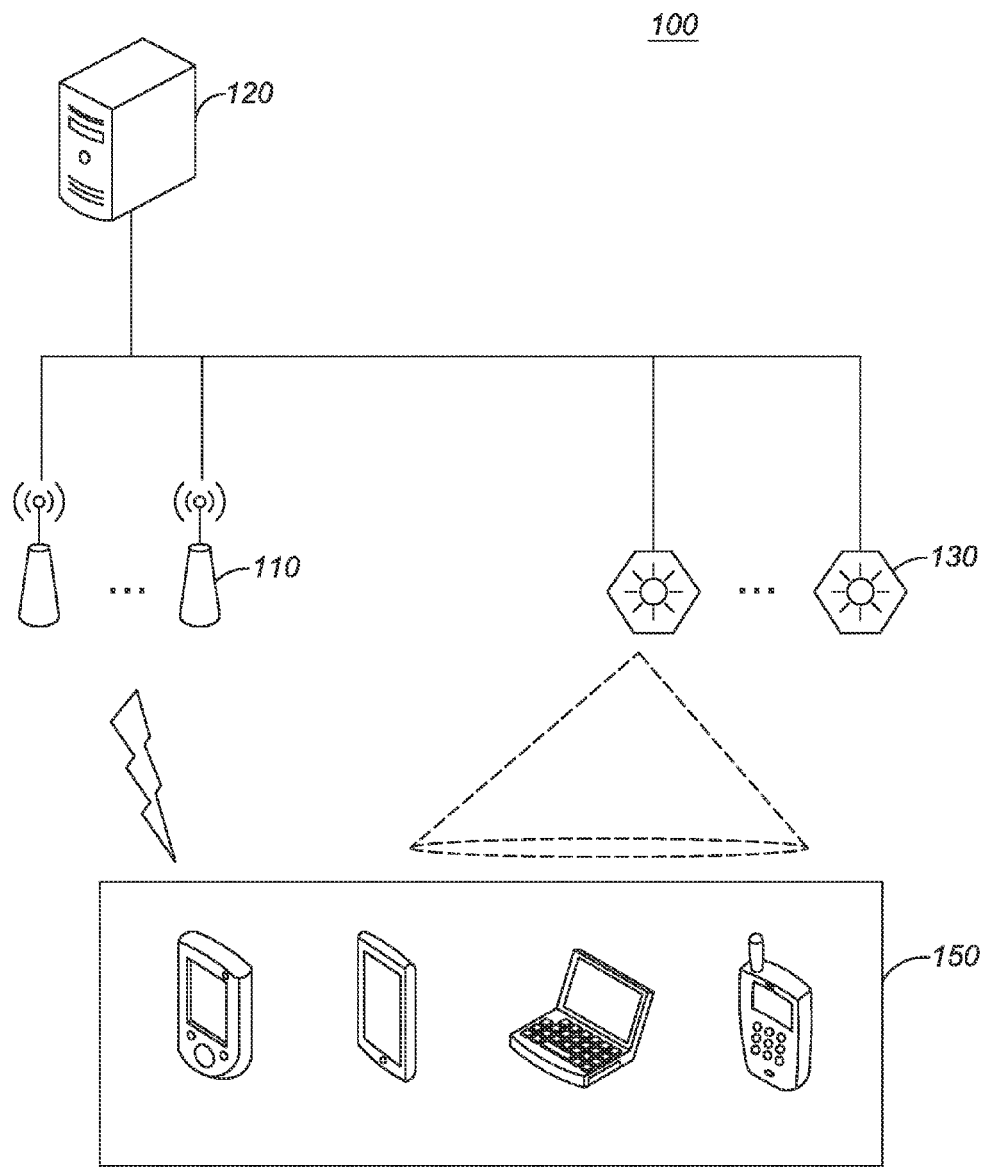
FIG. 1 is a network diagram illustrates a VPAN/WLAN interworking network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, systems and methods for Visible Light Communications Personal Area Network (VPAN) and Wireless Local Area Network (WLAN) interworking and mobility management are described. In an exemplary embodiment, a method includes receiving data traffic from both a Wireless Local Area Networking (WLAN) domain and a Visible Light Communications (VLC) domain, uniquely identifying, in a controller, a device in both the WLAN domain and the VLC domain as a same device using an addressing scheme associated with both the WLAN domain and the VLC domain, wherein the device is configured to operate in both the WLAN domain and the VLC domain, and providing data traffic to the device via one of the WLAN domain and the VLC domain based on a plurality of factors.

In another exemplary embodiment, a controller includes a network interface communicatively coupled to a wireless access point and one Visible Light Communications (VLC) access point; a processor; and memory storing instructions that, when executed, cause the processor to: receive data traffic from both the wireless access point and the VLC access point; uniquely identify a device using both the wireless access point and the VLC access point as a same device using an addressing scheme associated with a Wireless Local Area Network (WLAN) domain and a VLC domain, wherein the device is configured to operate in both the WLAN domain and the VLC domain; and provide data traffic to the device via one of the wireless access point and the VLC access point based on a plurality of factors.

In yet another exemplary embodiment, a network includes a wireless access point communicatively coupled to a device via a wireless connection; a visible light access point communicatively coupled to the device via a light connection; and a controller communicatively coupled to the wireless access point and the visible light access point; wherein the controller is configured to uniquely identify the device as a same device operating on either the wireless access point or the visible light access point based on an addressing scheme; and wherein the device is configured to utilize both the wireless access point and the visible light access point concurrently for data traffic providing traffic to the visible light access point using the addressing scheme that incorporates an address for the wireless connection therein.

Referring to FIG. 1, in an exemplary embodiment, a network diagram illustrates a VPAN/WLAN interworking network 100. The network 100 includes one or more WLAN/WiFi access points (APs) 110 which may be communicatively coupled to a controller 120 and one or more Visible Light Communication (VLC) devices which may be referred to as Light Fidelity (LiFi) access points (APs) 130 communicatively coupled to the controller 120. In another exemplary embodiment, the APs 110, 130 can be communicatively coupled to one another without the intervening controller 120. In yet another exemplary embodiment, the APs 110, 130 can be communicatively coupled to one another both with and without the intervening controller 120. In still yet another exemplary embodiment, one of the APs 110 can be a so-called virtualized controller performing functionality of the controller 120 within the AP 110 and with other APs 110, 130 being communicatively coupled to the virtualized controller. Note, the APs 110, 130 and the controller 120 can be communicatively coupled to one another via various wired and/or wireless networks. As is described herein, the network 100 is presented to describe VPAN/VLC/LiFi and WLAN/WiFi interworking systems and methods.

The network 100 further includes one or more devices 150 communicatively coupled to the APs 110, the APs 130, or both. Specifically, the devices 150 can include, without limitation, smart phones, tablets, netbooks, ultrabooks, laptops, personal digital assistants, desktops, or any other computing device with both WiFi and LiFi capability. The devices 150 can be stationary and/or mobile and use the APs 110, 130 for network connectivity. Note, within the context of the network 100, it is expected that the devices 150 can be both stationary and mobile at different times. For example, a tablet, ultrabook, netbook, etc. can be stationary when a user is working at a desk, and the same device could be mobile when the user is in transit or in a different area (e.g., conference room). Specifically, the APs 110, 130 can provide connectivity for the devices 150 to access the Internet, Local Area Networks (LAN), Wide Area Networks (WAN), Virtual Private Networks (VPN), and the like. The devices 150 each include both a wireless interface supporting WLAN/WiFi connectivity and a light interface support VLC/LiFi connectivity.

In an exemplary embodiment, the APs 110 can utilize IEEE 802.11 or variants thereof. IEEE 802.11 is a well-known and widely deployed WLAN standard that operates in the 2.4, 3.6 and 5 GHz frequency bands and provides shared wireless access with data rates up to 11 Mb/s (IEEE 802.11b), 54 Mbs/s (IEEE 802.11g), 150 Mb/s (IEEE 802.11n), and the like. Due to the widespread adoption, unregulated frequency bands and low cost, IEEE 802.11 has become the technology of choice for providing high-speed network access for smart phones, tablets, etc. As discussed herein, WLANs are becoming choked as the number of the APs 110 grows including overlapping deployments of the APs 110. It may not be an effective solution to continue to deploy more and more of the APs 110 for the devices 150 as there is finite bandwidth in the 2.4, 3.6 and 5 GHz frequency bands.

Visible Light Communications (as being defined in IEEE 802.15.7 WPAN Task Group 7 (TG7) Visible Light Communications) is a Wireless Personal Area Network (WPAN) standard using visible light communications and is commonly known as Visible Light Communications, in short VLC or LiFi. Specifically, a specification includes IEEE 802.15.7 "Short-Range Wireless Optical Communication Using Visible Light," Sep. 6, 2011, the contents of which are incorporated by reference herein. VLC can use visible light between frequencies of 400 THz (780 nm) and 800 THz (375 nm) for communicating to the devices 150 while the visible light optionally concurrently provides illumination in an area. Note, data modulation on the visible light is not perceived by and harmless to human eyes. In an exemplary embodiment, the APs 130 can use Light Emitting Diodes (LEDs) for speeds in the hundreds of Mb/s range to the devices 150. Advantageously, the APs 130 operate in different frequency ranges from the APs 110, i.e. visible light versus radio waves, providing an opportunity for offloading congested WLAN networks. Thus, in an exemplary embodiment, the APs 130 are envisioned to provide some relief from the WiFi spectrum scarcity that is being experienced because of the limited radio spectrum.

Compared to WLAN/WiFi, VLC/LiFi is expected to have more bandwidth available in a more localized manner. For example, WLAN/WiFi is shared wireless access and the wireless signals often propagate through walls or other physical barriers. VLC/LiFi is localized, shared light access and will not propagate through walls or other physical barriers. Further, VLC/LiFi will support larger bandwidths than WLAN/WiFi as there is more frequency spectrum available for transmissions in a more localized manner.

Figure 2:
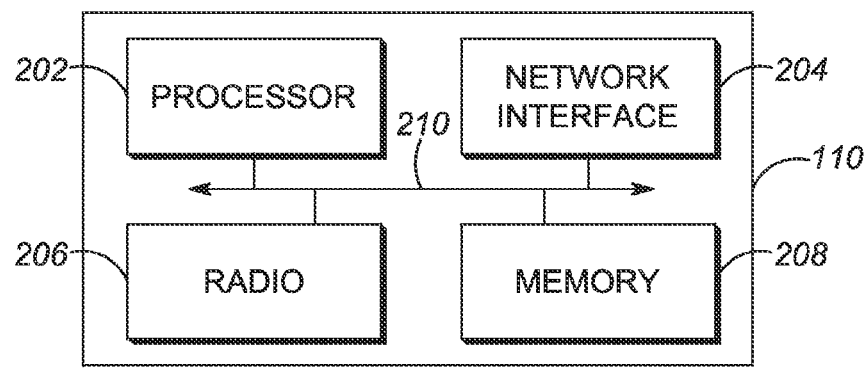
FIG. 2 is a block diagram of an implementation of a WLAN/WiFi AP for the network of FIG. 1 in accordance with some embodiments.
Figure 3:
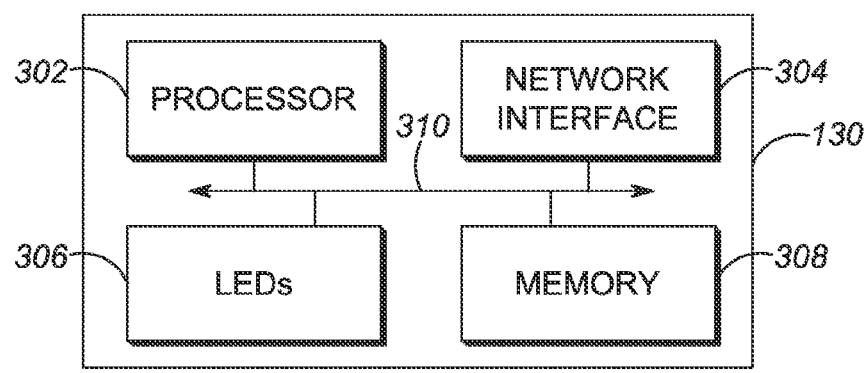
FIG. 3 is a block diagram of an implementation of a Visible Light Communications (VLC)/Light Fidelity (LiFi) AP for the network of FIG. 1 in accordance with some embodiments.

Referring to FIGS. 2 and 3, in an exemplary embodiment, block diagram illustrate implementations of the AP 110 and the AP 130. The APs 110, 130 can include a processor 202, 302, a network interface 204, 304, a radio 206 for the AP 110, LEDs 306 for the AP 130, and memory 208, 308, each of which is communicatively coupled to one another via a local interface 210, 310. The processor 202, 302 can be any custom made or commercially available processor, a central processing unit (CPU), an auxiliary processor among several processors, a semiconductor-based microprocessor (in the form of a microchip or chip set), an application specific integrated circuit (ASIC), a field programmable gate array (FPGA), or generally any device for executing software instructions. When the AP 110, 130 is in operation, the processor 202, 302 is configured to execute software stored within the memory 208, 308, to communicate data to and from the memory, and to generally control operations of the AP 110, 130 pursuant to the software instructions. For the AP 110, the processor 202 can be configured to perform functionality related to providing IEEE 802.11 access to the devices 150. For the AP 130, the processor 302 can be configured to perform functionality related to providing IEEE 802.15.7 or VLC access to the devices 150.

The network interface 204, 304 is used to enable the AP 110, 130 to communicate on a network, such to the controller 120. The network interface 204, 304 can include, for example, an Ethernet card (e.g., 10BaseT, Fast Ethernet, Gigabit Ethernet), a wireless local area network (WLAN) card (e.g., 802.11a/b/g/n or proprietary wireless protocol based mesh network), or the like. The network interface 204, 304 can include address, control, and/or data connections to enable appropriate communications on the network. The memory 208, 308 is used to store data, such as configuration data, operating instructions, and the like. The memory 208, 308 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 208, 308 can incorporate electronic, magnetic, optical, and/or other types of storage media. Note that the memory 208, 308 can have a distributed architecture, where various components are situated remotely from one another, but can be accessed by the processor 202, 302.

The AP 110 can include one or more of the radio 206 which are configured to receive and transmit wireless signals according to a predetermined protocol such as a variant of IEEE 802.11. The radio 206 includes an antenna interfacing wireless signals with the devices 150 and Radio Frequency (RF) components to modulate/demodulate the wireless signals. The AP 130 can include one or more of the LEDs 306 which are configured to receive and transmit visible light according to a predetermined protocol such as a variant of IEEE 802.15.7 or other VLC protocol. The LEDs 306 include light emitting elements which transmit modulated data on visible light and light sensing elements which receive modulate data on visible light. The local interface 210, 310 can be, for example but not limited to, one or more buses or other wired or wireless connections, as is known in the art. The local interface 210, 310 can have additional elements, which are omitted for simplicity, such as controllers, buffers (caches), drivers, repeaters, and receivers, among many others, to enable communications. Further, the local interface 210, 310 can include address, control, and/or data connections to enable appropriate communications among the aforementioned components.

Figure 4:
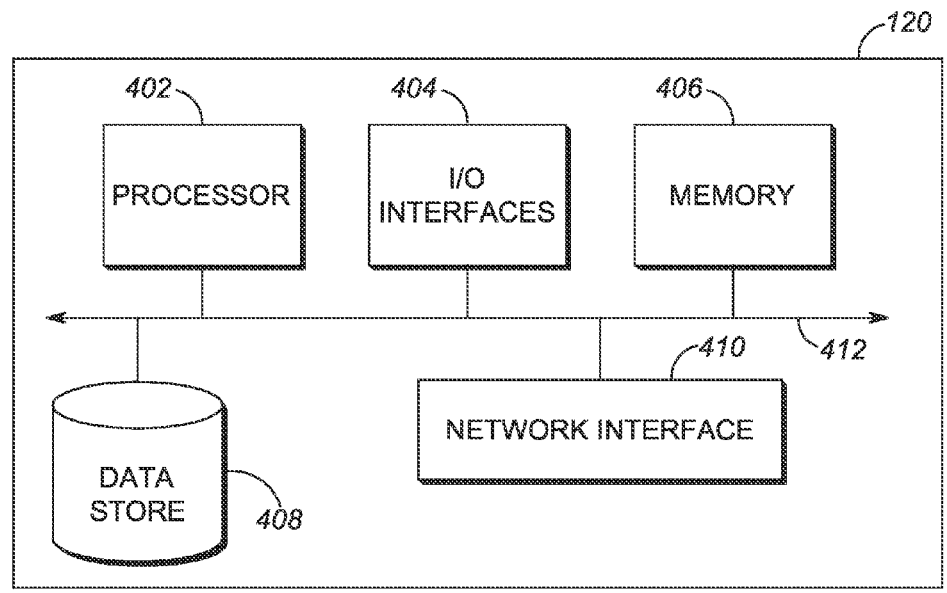
FIG. 4 is a block diagram of an implementation of a controller for the network of FIG. 1 in accordance with some embodiments.

Referring to FIG. 4, in an exemplary embodiment, a block diagram illustrates an implementation of the controller 120. The controller 120 can be a digital computer that, in terms of hardware architecture, generally includes a processor 402, input/output (I/O) interfaces 404, memory 406, a data store 408, and network interfaces 410. The components 402, 404, 406, 408, 410 are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 can include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the controller 120, a semiconductor-based microprocessor (in the form of a microchip or chip set), or generally any device for executing software instructions. When the controller 120 is in operation, the processor 402 is configured to execute software stored within the memory 406, to communicate data to and from the memory 406, and to generally control operations of the controller 120 pursuant to the software instructions. The I/O interfaces 404 can be used to receive user input from and/or for providing system output to one or more devices or components. User input can be provided via, for example, a keyboard and/or a mouse. System output can be provided via a display device and a printer (not shown). I/O interfaces 404 can include, for example, a serial port, a parallel port, a small computer system interface (SCSI), an infrared (IR) interface, a radio frequency (RF) interface, and/or a universal serial bus (USB) interface.

The memory 406 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 406 can incorporate electronic, magnetic, optical, and/or other types of storage media. Note that the memory 406 can have a distributed architecture, where various components are situated remotely from one another, but can be accessed by the processor 402. Software in the memory 406 can include one or more software programs, each of which includes an ordered listing of executable instructions for implementing logical functions, such as an operating system. The operating system essentially controls the execution of other computer programs, provides scheduling, input-output control, file and data management, memory management, and communication control and related services.

The data store 408 can be used to data. The data store can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the data store can incorporate electronic, magnetic, optical, and/or other types of storage media. In one example, the data store 408 can be located internal to the controller 120 such as, for example, an internal hard drive connected to the local interface 412 in the controller 120. Additionally in another embodiment, a data store 408 can be located external to the controller 120 such as, for example, an external hard drive connected to the I/O interfaces 404 (e.g., SCSI or USB connection). Finally in a third embodiment, a data store 408 may be connected to the controller 120 through a network, such as, for example, a network attached file server or the like.

The network interfaces 410 can be used to enable the controller 120 to communicate on a network. The network interfaces 410 can include, for example, an Ethernet card (e.g., 10BaseT, Fast Ethernet, Gigabit Ethernet) or a wireless local area network (WLAN) card (e.g., 802.11a/b/g). The network interfaces 410 can include address, control, and/or data connections to enable appropriate communications on the network. For the controller 120, the network interfaces 410 are utilized to communicate with the APs 110, 130, other controllers 120, external devices, and the like.

In an exemplary embodiment, the APs 110, 130 can be "thin" devices. The thin APs are referred to as "thin" because the associated devices on the thin APs do minimal frame processing. Instead, the thin APs simply behave as a wireless antenna port or light reception/transmission port, forwarding received frames to controller 120 over the network interface 204, 304. In another exemplary embodiment, the APs 110, 130 can do full processing and forwarding of frames relying on the controller 120 for management and configuration. Of course, a combination of both approaches is contemplated herein. In an exemplary embodiment, the LiFi APs 130 can be similar to the WiFi APs 110. Note, there can be a LiFi controller as well similar to the controller 120. The LiFi controller can be communicatively coupled to the controller 120 for the various interworking systems and methods described herein.

In another exemplary embodiment, one of the APs 110 can include sufficient processing power to act as a virtualized controller thereby eliminating the need for the controller 120 while providing similar functions. The virtualized controller is communicatively coupled to other APs 110, 130 for providing the systems and methods described herein. As is described herein, reference to a controller can include the controller 120 and/or a virtualized controller via one of the APs 110, 130. In an exemplary embodiment, the controller 120 can be integrated in a single device controlling both types of the APs 110, 130 concurrently. Alternatively, the controller 120 can be multiple devices interconnected therebetween and operating in a coordinated manner.

In various exemplary embodiments, the network 100 includes interworking systems and methods between the APs 110, 130 and the controller 120 to leverage VLC connectivity to offload WLAN connectivity as appropriate. There is substantial potential for VLC/LiFi and WLAN/WiFi technologies to work together to offer better/enormous amounts of wireless bandwidth for end users to solve the bandwidth problem described herein at the same time providing seamless mobility of a device between both domains. VLC/VPAN is well suited for Fixed Wireless Access where one of the devices 150 is mostly stationary. It can work for mobile wireless access as well but not as efficient as WLAN as VLC/VPAN requires visibility between the communicating end points to be present. WIFI/WLAN is well suited for both stationary as well as mobile wireless access. The interworking systems and methods leverage unified control by the controller 120 and/or the virtualized controller to offer VLC/LiFi access to offload WLAN/WiFi access.

Figure 5:
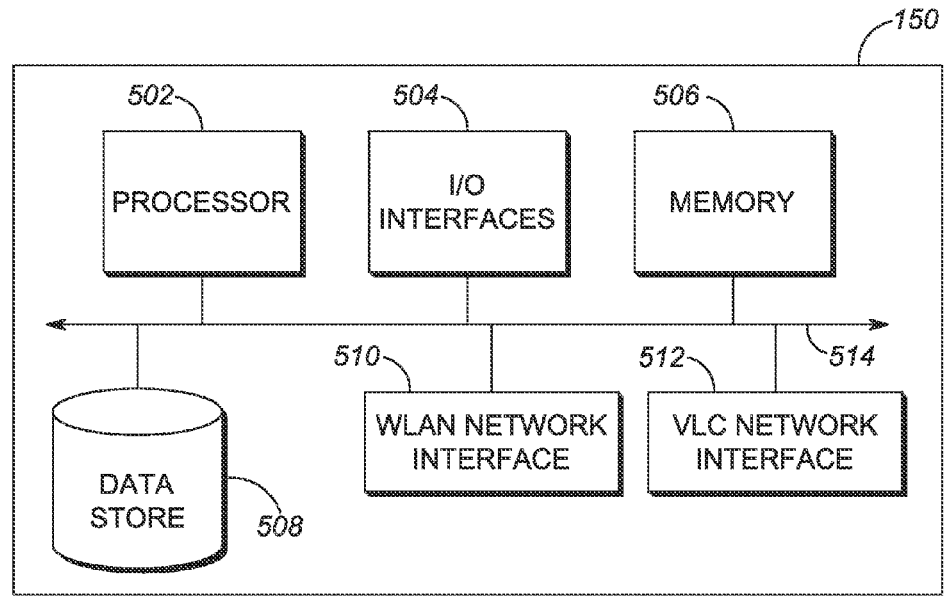
FIG. 5 is a block diagram of an implementation of a device for the network of FIG. 1 in accordance with some embodiments.

Referring to FIG. 5, in an exemplary embodiment, a block diagram illustrates an implementation of one of the devices 150. The device 150 can be a digital computer that, in terms of hardware architecture, generally includes a processor 502, input/output (I/O) interfaces 504, memory 506, a data store 508, a WLAN network interface 510, and a VLC network interface 512. The components 502, 504, 506, 508, 510, 512 are communicatively coupled via a local interface 514. The local interface 514 can be, for example but not limited to, one or more buses or other wired or wireless connections, as is known in the art. The local interface 514 can have additional elements, which are omitted for simplicity, such as controllers, buffers (caches), drivers, repeaters, and receivers, among many others, to enable communications. Further, the local interface 514 can include address, control, and/or data connections to enable appropriate communications among the aforementioned components.

The processor 502 is a hardware device for executing software instructions. The processor 502 can be any custom made or commercially available processor, a central processing unit (CPU), an auxiliary processor among several processors associated with the device 150, a semiconductor-based microprocessor (in the form of a microchip or chip set), or generally any device for executing software instructions. Optionally, the processor 502 can include a mobile optimized architecture. When the device 150 is in operation, the processor 502 is configured to execute software stored within the memory 506, to communicate data to and from the memory 506, and to generally control operations of the device 150 pursuant to the software instructions. The I/O interfaces 504 can be used to receive user input from and/or for providing system output to one or more devices or components. User input can be provided via, for example, a touch screen. System output can be provided via a display device. I/O interfaces 504 can include, for example, a serial port, a parallel port, a small computer system interface (SCSI), an infrared (IR) interface, a radio frequency (RF) interface, a Bluetooth interface, and/or a universal serial bus (USB) interface.

The memory 506 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 506 can incorporate electronic, magnetic, optical, and/or other types of storage media. Note that the memory 506 can have a distributed architecture, where various components are situated remotely from one another, but can be accessed by the processor 502. Software in the memory 506 can include one or more software programs, each of which includes an ordered listing of executable instructions for implementing logical functions, such as an operating system. The operating system essentially controls the execution of other computer programs, provides scheduling, input-output control, file and data management, memory management, and communication control and related services.

The data store 508 can be used to data. The data store can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the data store can incorporate electronic, magnetic, optical, and/or other types of storage media. The WLAN network interface 510 can be used to enable the device 150 to communicate with the APs 110. The WLAN network interface 510 can include, for example, a WLAN card (e.g., 802.11a/b/g). The VLC network interface 512 can be used to enable the device 150 to communicate with the APs 130. The network interfaces 510, 512 can include address, control, and/or data connections to enable appropriate communications on the network. Further, the network interfaces 510, 512 can include software drivers and configurations such that the controller 120 can recognize the device 150 operating via the APs 110, 130.

Figure 6:
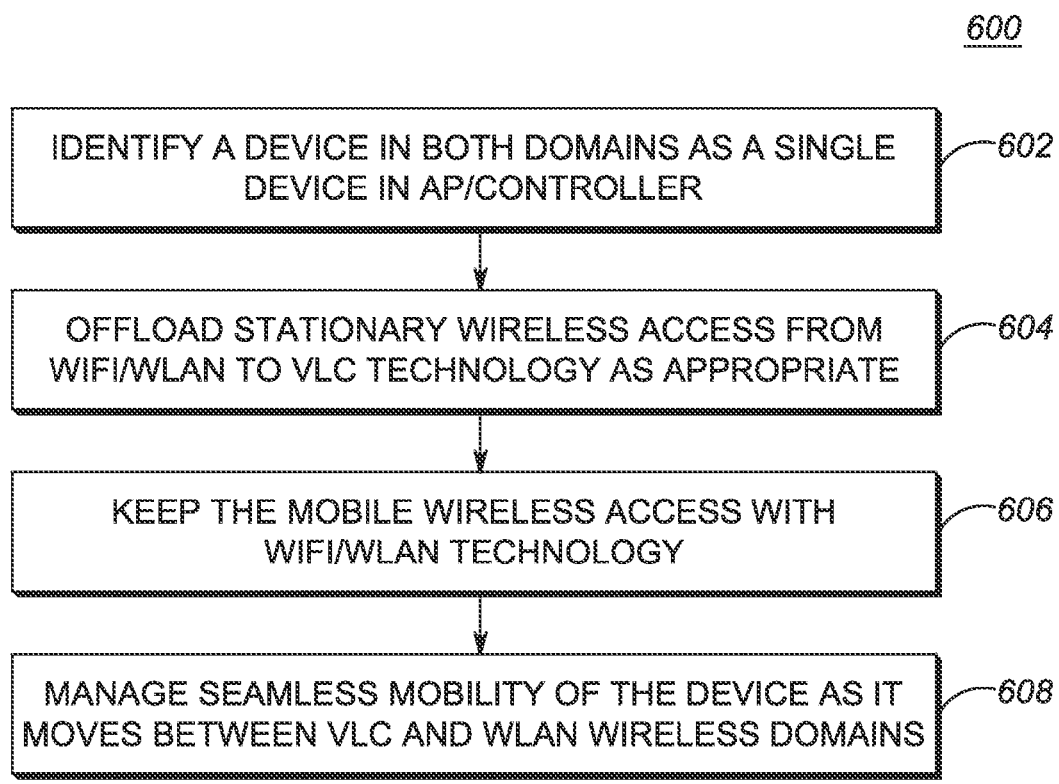
FIG. 6 is a flowchart illustrates a WLAN/WiFi and VLC/LiFi interworking method in accordance with some embodiments.

Referring to FIG. 6, in an exemplary embodiment, a flowchart illustrates a WLAN/WiFi and VLC/LiFi interworking method 600. The interworking method 600 can operate on the controller 120 and/or the virtualized controller in the network 100. First, the interworking method 600 identifies a device, i.e. one of the devices 150, in both the WLAN/WiFi domain and the VLC/LiFi domain as a single device in the controller 120 and/or the virtualized controller (step 602). The interworking method 600 includes offloading stationary wireless access from the WLAN/WiFi domain to the VLC/LiFi domain as appropriate (step 604). Here, the objective is not to offload all WLAN/WiFi traffic, but as much as possible. The interworking method 600 keeps mobile wireless access with the WLAN/WiFi technology even when broadcasting primarily in the VLC/LiFi domain (step 606). Finally, the interworking method 600 manages seamlessly mobility of the device as it moves between the WLAN/WiFi domain and the VLC/LiFi domain (step 608).

Of note, the interworking method 600 tracks each of the devices 150 as a single device in both of the domains via a unified addressing scheme. Specifically, a particular device 150 can access either of the APs 110, 130, but from the perspective of the controller 120 and/or the virtualized controller, the device 150 is seen as a single, unified device. As such, the device 150 can seamlessly switch between the domains without traffic interruption. This is important especially for real-time traffic streams and the like. The interworking method 600 contemplates two interworking approaches which are discussed as follows.

In a first interworking approach, IEEE 802.15.7/VPAN has a mode for point-to-multi-point communications where the AP 130 works in beacon or non-beacon mode to enable multiple devices to communicate with it. The AP 130 can provide uplink wired access to the devices 150 communicating with it through VLC. In this approach, the controller 120 and/or the virtualized controller can be a wireless access controller that is enhanced to adopt, manage and control the APs 130. Note, conventional wireless access controllers only support the WLAN APs 110. IEEE 802.11 works with Media Access Control (MAC) addresses which are 48 bits in length similar to the IEEE 802.3 Ethernet standard. Here, Source and Destination MAC addresses are used by end points to communicate with each other.

IEEE 802.15.7 works with VPAN addresses which include two types: 64 bit length long addresses and 16 bit short address. In this approach, a VLC driver on the device 150, such as operating with the VLC network interface 512, is configured to work with the 64 bit long addresses. The VLC driver is enhanced herein to choose the 64 bit address for itself as below <16 short address+48 bits of WLAN interface MAC Address>

The above combination can be in any order, for example, most significant bit (MSB) 16 bits short address and least significant bit (LSB) 48 bits of WLAN MAC, MSB 48 bits of WLAN MAC and LSB 16 bits short address, or 48 bit WLAN MAC embedded anywhere in the 64 bit address space with the rest of 16 bits being the short address. Thus, this approach uses the 16 bit short address for VLC plus the 48 bit WLAN address for identifying the device 150.

With the above approach, two levels of addressing are achieved with a single 64 bit address, i.e. the 16 bit short address is used to identify VPAN end points and the remaining 48 bit WLAN MAC address is used or identify a WLAN end point. With this addressing scheme, the controller 120 and/or the virtualized controller can track the device 150 whenever it connects to either of the APs 110, 130 or both simultaneously, i.e., the controller 120 and/or the virtualized controller knows that it is the same device 150 in both domains. The controller 120 and/or the virtualized controller can also construct a table of <16-bit-VPAN-short-address to 48-bit-MAC-address mappings>. Thus, the VPAN interface on the VLC network interface 512 appears like a logical IEEE 802.3 Ethernet interface on the device 150 just like the WLAN network interface 510.

Whenever the device 150 wants to transmit data over VPAN to the APs 130, the device 150 just sends an IEEE 802.3 frame having the following packet format to the VPAN logical interface:

[48-bit-MAC-destination, 48-bit-MAC-source+802.1Q tag (optional)+EtherType (Ethernet II) or length (IEEE 802.3)+Payload+Frame check sequence (32 bit CRC)].

The VLC driver in the device 150 changes the above IEEE 802.3 frame below to send to its coordinator/VPAN Access Point over VLC to be sent to the destination identified by 48-bit-MAC-destination:

[16_bit_VPAN_COORDINATOR_Address+48-bit-MAC-destination, 16_bit_mobile_device_short_VPAN_Address+48-bit-MAC-source, LLC/SNAP header containing 802.1Q tag (optional)+EtherType (Ethernet II) or length (IEEE 802.3), other header fields in VPAN frame as documented in the standard].

The VPAN Coordinator which is the controller 120, on receiving the VLC frame above, reconstructs the original IEEE 802.3 frame and bridges it like a regular IEEE 802.3 frame. The reply packet undergoes similar transformations in the opposite direction (the AP 130 constructs the VLC frame and the device 150 reconstructs the IEEE 802.3 frame from the VLC frame). For this, the VPAN_AP uses the table of <16-bit-VPAN-short-address to 48-bit-MAC-address mappings table constructed by the controller 120 and/or the virtualized controller to find out which VPAN short address to use for a given MAC address.

For step 604, when both WiFi and LiFi are available, the method 600 can use any one or combination of various factors for choosing which physical link (WiFi or LiFi). The various factors can include, without limitation, based on the traffic flow type; based on WiFi; based on the WiFi Received Signal Strength Indication (RSSI), light signal strength; based on location; based on the remaining power level in the device's 150 battery/power source (battery/AC powered); and the like.

The device's 150 software can be modified to take the same approach for traffic that originates from itself. This requires driver code modifications or introduction of a logical interface with its own software that uses either LiFi or WiFi based on the kind of criteria described above. With respect to mobility of the device 150, LiFi/WiFi device movement can be detected by WiFi RSSI and light signal strength measurement and reporting. The LiFi/WiFi AP 110, 130 which receives the measurement report can determine the device movement and its speed and direction. At this point, the controller 120 and/or the virtualized controller become a WiFi+Optical Access Controller.

In a second interworking approach, entire IEEE 802.3 frames can be tunneled in VLC frames. Here, the VLC driver could use either short addresses or long addresses. Use of long addresses decreases the throughput that can be achieved through VLC. Use of short addresses while tunneling the IEEE 802.3 frames should give equivalent throughout as the first approach as the decreased address size compensates for the tunneling overhead. Again, the VLC interface appears as a logical Ethernet interface on the device 150 and uses the WiFi interfaces MAC address as its logical MAC. The controller 120 and/or the virtualized controller construct a table of <16-bit-VPAN-short-address to 48-bit-MAC-address mapping> in this case as well.

The interworking method 600 contemplates various schemes for mobility management between the VLC and WLAN Domains. Various approaches can include using LiFi for both upstream-and-downstream or downstream traffic alone where upstream continues to flow over WiFi. For example, all traffic from client to server can go on WiFi from the device 150 to the AP 110, while all traffic from server-to-client which is majority of the data transferred in case of Web flows go over LiFi from the AP 130 to the device 150. This can provide significant relief to WiFi spectrum as it drastically reduces traffic over WiFi. To prevent loops in the network 100, broadcast/multicast traffic is sent to the device 150 using only either WiFi or LiFi and the device 150 does not bridge broadcast/multicast traffic over to the other interface.

Once the device 150 connects with both the APs 110, 130 according to procedures described above in the two interworking approaches, the controller 120 and/or the virtualized controller know the device's 150 identity in both domains. Using this information, the controller 120 and/or the virtualized controller can provide a mixed mode of operation as described herein in the use cases of the VLC/LiFi technology providing upstream access using WiFi and downstream using VLC/LiFi. i.e., the device 150 connects to the AP 110, 130 using both WiFi and LiFi while it is stationary (like when it is placed on a table). The device 150 uses WiFi to send traffic upstream, but can receive downstream traffic over LiFi. The controller 120 and/or the virtualized controller help achieve this goal by knowing about the fact that the device 150 is connected to itself through both WiFi and LiFi, it transmits all downstream traffic through LiFi via the APs 130.

It can easily happen that while download is in progress, a user of the device 150 moves away from the LiFi AP 130 (e.g., the user wants to move to a conference room to attend a meeting). The AP 130 can detect this movement as soon as the device's 150 connection to the AP's 130 transmitter breaks or is has decreased light detection, and immediately start sending the downstream traffic through WiFi via the AP 110. This helps in preventing the download from breaking/stopping because of LiFi connection teardown. It is also possible that, while the device 150 is stationary it uses LiFi itself for both upstream and downstream traffic while just keeping its WiFi connection intact as a backup. In this case as well, as soon as the LiFi connection breaks the AP 110 starts sending traffic down WiFi. Similarly, the device 150 also switches to using WiFi to send data upstream immediately.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
receiving data traffic from both a Wireless Local Area Networking (WLAN) domain and a Visible Light Communications (VLC) domain;
uniquely identifying, in a controller, a device in both the WLAN domain and the VLC domain as a same device using an addressing scheme associated with both the WLAN domain and the VLC domain, wherein the device is configured to operate in both the WLAN domain and the VLC domain; and
providing data traffic to the device via one of the WLAN domain and the VLC domain based on a plurality of factors, wherein, when the data traffic to the device is provided via the VLC domain, the method further comprises:
detecting a change in a light connection in the VLC domain, and
sending the data traffic via the WLAN domain responsive to the change.

2. The method of claim 1, wherein the addressing scheme comprises using a single address in the VLC domain which comprises an address from the WLAN domain and an address from the VLC domain in the single address.

3. The method of claim 2, wherein the single address comprises a Media Access Control (MAC) address from the WLAN domain combined with a short address from the VLC domain.

4. The method of claim 3, wherein the WLAN domain operates in accordance with IEEE 802.11 and variants thereof and the VLC domain operates in accordance with IEEE 802.15.7 and variants thereof;
wherein the single address comprises a 16 bit short address from the VLC domain and a 48 bit MAC address from the WLAN domain.

5. The method of claim 3, further comprising:
maintaining a table in the controller of mappings of the short address to the MAC address; and
utilizing the table in a VLC access point to determine the short address to use for a given MAC address.

6. The method of claim 2, further comprising:
transmitting a frame from the device over the VLC domain by sending a frame with a first format from the device and modifying the frame to a second format in a VLC driver in the device to append the address from the VLC domain thereto;
receiving the frame at the controller and reconstructing the frame to the first format.

7. The method of claim 2, wherein the plurality of factors comprise traffic flow type, wireless Received Signal Strength Indication, light signal strength, location, and a combination thereof.

8. The method of claim 1, wherein the addressing scheme comprises using a tunnel to transmit a frame compliant to the WLAN domain in a format compliant to the VLC domain.

9. The method of claim 1, further comprising:
providing data traffic to the device via the VLC domain when available;
detecting a change in light strength in the VLC domain indicating mobility; and
providing the data traffic to the device via the WLAN domain when the VLC domain is unavailable or based on the mobility, wherein a connection is maintained to the device in the WLAN domain while the device operates in the VLC domain.

10. The method of claim 1, further comprising:
constraining multicast and broadcast traffic associated with the device to only one of the WLAN domain and the VLC domain.

11. A controller, comprising:
a network interface communicatively coupled to a wireless access point and a Visible Light Communications (VLC) access point;
a processor; and
memory storing instructions that, when executed, cause the processor to:
receive data traffic from both the wireless access point and the VLC access point;
uniquely identify a device using both the wireless access point and the VLC access point as a same device using an addressing scheme associated with a Wireless Local Area Network (WLAN) domain and a VLC domain, wherein the device is configured to operate in both the WLAN domain and the VLC domain; and
provide data traffic to the device via one of the wireless access point and the VLC access point based on a plurality of factors, wherein, when the data traffic to the device is provided via the VLC access point, the instructions further cause the processor to:
detect a change in a light connection in the VLC domain, and
send the data traffic via the wireless access point responsive to the change.

12. The controller of claim 11, wherein the addressing scheme comprises using a single address in the VLC domain which comprises an address from the WLAN domain and an address from the VLC domain in the single address;
wherein the single address comprises a Media Access Control (MAC) address from the WLAN domain combined with a short address from the VLC domain.

13. The controller of claim 12, wherein the instructions that, when executed, further cause the processor to:
maintain a table in the controller of mappings of the short address to the MAC address; and
utilize the table in the VLC access point to determine the short address to use for a given MAC address.

14. The controller of claim 12, wherein the instructions that, when executed, further cause the processor to:
receive a frame from the device from the VLC access point, wherein the device sends the frame with a first format from the device and modifies the frame to a second format in a VLC driver in the device to append the address from the VLC domain thereto;
receive the frame in the second format and reconstruct the frame to the first format.

15. The controller of claim 11, wherein the addressing scheme comprises using a tunnel to transmit a frame compliant to the WLAN domain in a format compliant to the VLC domain.

16. The controller of claim 12, wherein the instructions that, when executed, further cause the processor to:
provide data traffic to the device via the VLC access point when available;
detect a change in light strength in the VLC domain indicating mobility; and
provide data traffic to the device via the wireless access point when the VLC domain is unavailable or based on the mobility, wherein a connection is maintained to the device in via the wireless access point while the device operates in the VLC domain.

17. The controller of claim 12, wherein the instructions that, when executed, further cause the processor to:
constrain multicast and broadcast traffic associated with the device to only one of the WLAN domain and the VLC domain.

18. A network, comprising:
a wireless access point communicatively coupled to a device via a wireless connection;
a visible light access point communicatively coupled to the device via a light connection; and
a controller communicatively coupled to the wireless access point and the visible light access point;
wherein:
the controller is configured to uniquely identify the device as a same device operating on either the wireless access point or the visible light access point based on an addressing scheme,
the device is configured to utilize both the wireless access point and the visible light access point concurrently for data traffic providing traffic to the visible light access point using the addressing scheme that incorporates an address for the wireless connection therein, and
the visible light access point is configured to detect a change in the light connection and cause the data traffic to be sent via the wireless access point responsive to the change.

19. The network of claim 18, wherein the device is configured to transmit a data frame with a Media Access Control (MAC) address associated with the wireless connection and to append an address associated with the light connection if the light connection is available thereby offloading the wireless access point.

* * * * *